(12) United States Patent
Gliere

(10) Patent No.: US 11,119,073 B2
(45) Date of Patent: Sep. 14, 2021

(54) PHOTOACOUSTIC DEVICE FOR DETECTING GAS AND METHOD FOR MANUFACTURING SUCH A DEVICE

(71) Applicant: COMMISSARIAT A L'ENERGIE ATOMIQUE ET AUX ENERGIES ALTERNATIVES, Paris (FR)

(72) Inventor: Alain Gliere, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 100 days.

(21) Appl. No.: 16/623,189

(22) PCT Filed: Jun. 15, 2018

(86) PCT No.: PCT/EP2018/065936
§ 371 (c)(1),
(2) Date: Apr. 7, 2020

(87) PCT Pub. No.: WO2018/229248
PCT Pub. Date: Dec. 20, 2018

(65) Prior Publication Data
US 2020/0240958 A1 Jul. 30, 2020

(30) Foreign Application Priority Data
Jun. 16, 2017 (FR) .................... 1755471

(51) Int. Cl.
*G01N 29/24* (2006.01)
*G01N 21/17* (2006.01)

(52) U.S. Cl.
CPC ..... *G01N 29/2425* (2013.01); *G01N 21/1702* (2013.01); *G01N 2021/1704* (2013.01); *G01N 2291/021* (2013.01)

(58) Field of Classification Search
CPC .... G01N 29/2425; G01N 29/02; G01N 29/14; G01N 21/1702; G01N 2021/1704; G01N 2291/021
See application file for complete search history.

(56) References Cited

U.S. PATENT DOCUMENTS 6,150,630 A * 11/2000 Perry ................... B23K 26/382
219/121.68
7,304,732 B1 12/2007 Polcawich et al.
(Continued)

FOREIGN PATENT DOCUMENTS

EP 1 211 501 A1 6/2002
EP 2 515 096 A1 10/2012
(Continued)

OTHER PUBLICATIONS

International Search Report as issued in International Patent Application No. PCT/EP2018/065936, dated Aug. 31, 2018.
(Continued)

*Primary Examiner* — Suman K Nath
(74) *Attorney, Agent, or Firm* — Pillsbury Winthrop Shaw Pittman LLP

(57) ABSTRACT

A photoacoustic device for detecting gas includes a photoacoustic cavity having a side wall extending between a first end and a second end and having an outer surface; a light source suitable for emitting a modulated light radiation, and coupled to the first end; a microphone coupled to the side wall, the photoacoustic cavity being made of a material transparent to the light radiation of the light source; a mirror being arranged on at least one portion of the outer surface of the side wall; and the side wall having a thickness chosen as a function of the depth of penetration δ of a thermal wave coming from the mirror into the transparent material.

18 Claims, 9 Drawing Sheets

(56) References Cited

U.S. PATENT DOCUMENTS

2008/0204757 A1 8/2008 Manning
2018/0284012 A1* 10/2018 Marta ................ G01N 29/4436

FOREIGN PATENT DOCUMENTS

| FR | 2 599 505 A1 | 12/1987 |
| FR | 3 017 950 A1 | 8/2015 |
| WO | WO 2017/044436 A1 | 3/2017 |

OTHER PUBLICATIONS

Nicoletti, S., et al., "Challenges in the realization of a fully integrated optical lap-on-chip," IEEE Sensors Proceedings 2014, Nov. 2014, XP032705458, pp. 649-652.

* cited by examiner

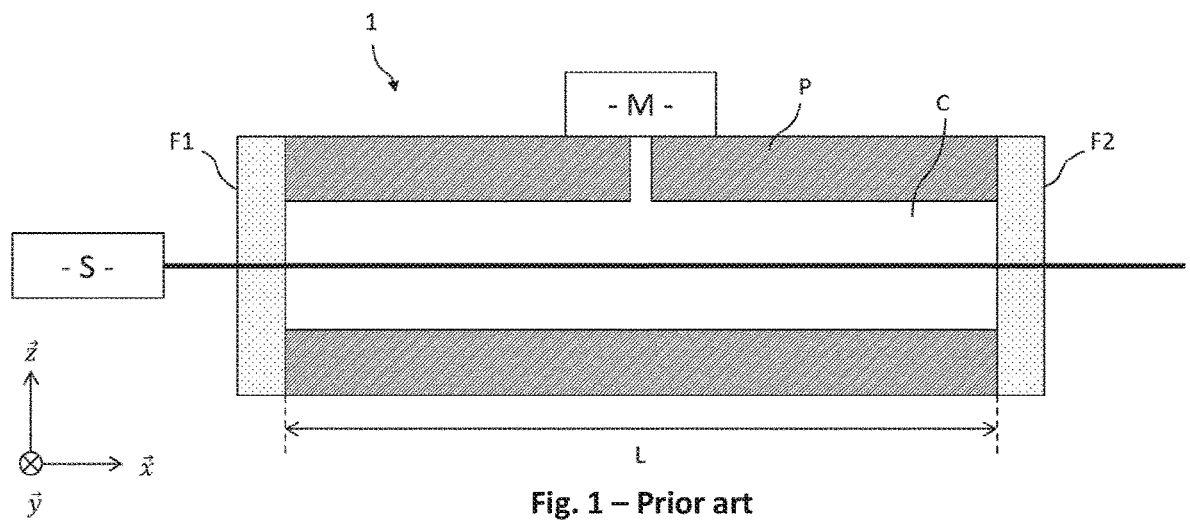
Fig. 1 – Prior art
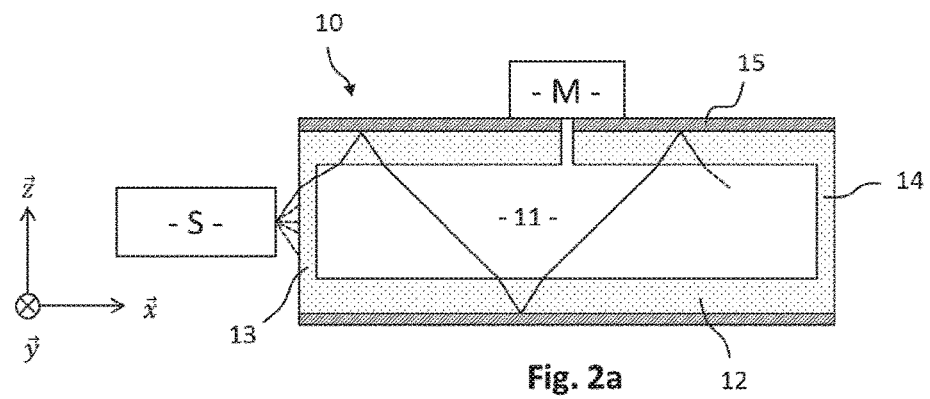
Fig. 2a

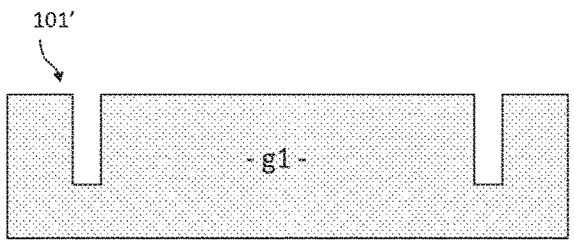
Fig. 9a1'
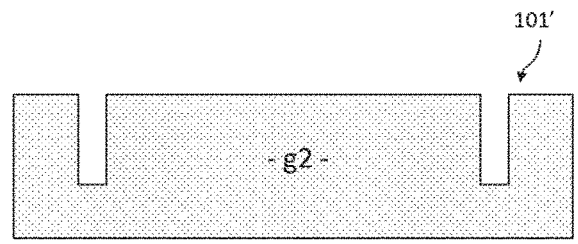
Fig. 9a2'
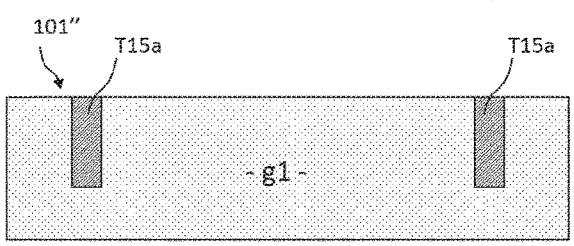
Fig. 9a1''
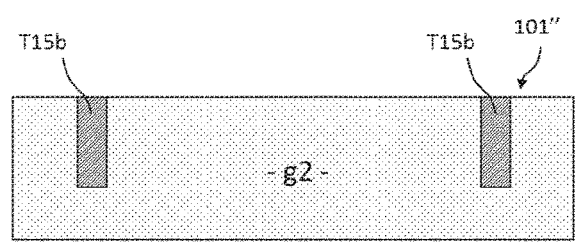
Fig. 9a2''
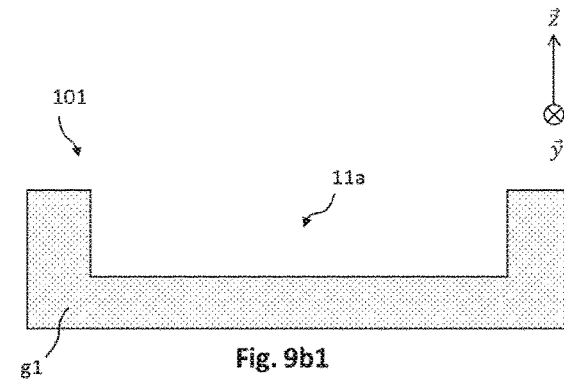
Fig. 9b1
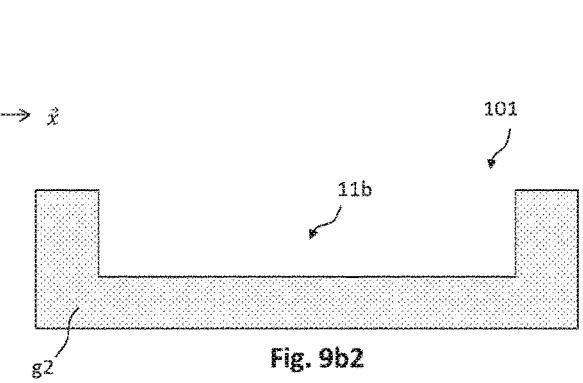
Fig. 9b2
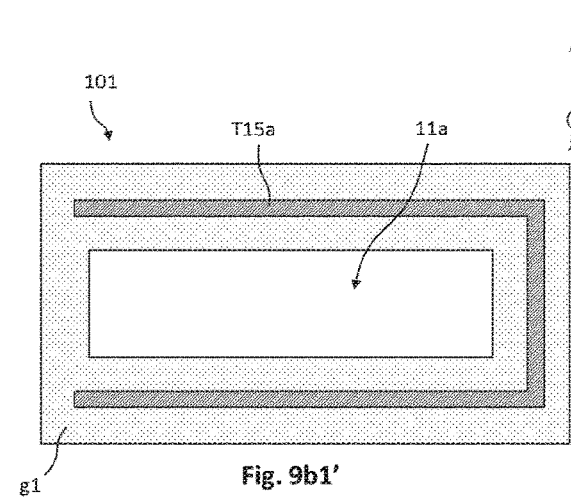
Fig. 9b1'
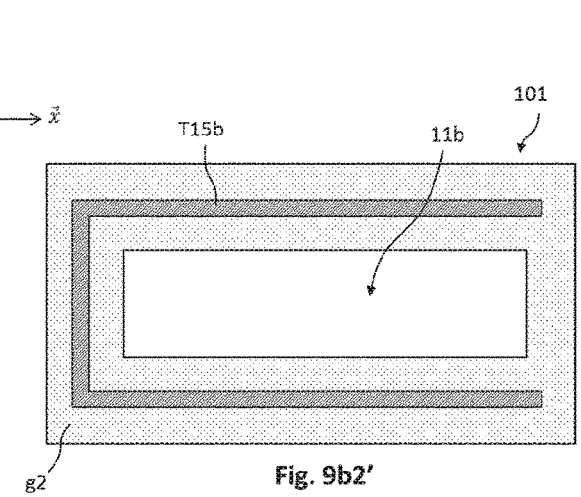
Fig. 9b2'

PHOTOACOUSTIC DEVICE FOR DETECTING GAS AND METHOD FOR MANUFACTURING SUCH A DEVICE

CROSS-REFERENCE TO RELATED APPLICATIONS

This application is the U.S. National Stage of PCT/EP2018/065936, filed Jun. 15, 2018, which in turn claims priority to French patent application number 1755471 filed Jun. 16, 2017. The content of these applications are incorporated herein by reference in their entireties.

TECHNICAL FIELD OF THE INVENTION

The technical field of the invention is that of gas detection.

The present invention relates to a photoacoustic device for detecting gas, and a method for manufacturing such a device.

TECHNOLOGICAL BACKGROUND OF THE INVENTION

To detect a gas by means of a conventional photoacoustic device, an acoustic wave is created in a gas by means of a modulated light source which is generally a laser. The wavelength of the radiation of the light source is chosen to interact specifically with the molecules of the gas to detect. In the presence of the gas to detect, an interaction thus takes place between the molecules of said gas and the light radiation, which results in an absorption of energy of the light radiation by said molecules. The molecules having absorbed the energy next restore this energy in the form of heating. The light source being modulated, the heating formed generates a pressure wave which may be measured by a microphone. The absence or the presence of a particular gas in greater or lesser quantity is thus detected.

Compared to absorption spectroscopy techniques, an advantage of the photoacoustic technique is that in the absence of the gas to detect, the measured acoustic signal is zero. In the presence of traces of the gas to detect, a small signal on zero background is thus measured, which is highly favourable with regard to the signal to noise ratio.

However, in practice, the gas to detect being confined in a chamber (resonant or not), a parasitic background signal appears, which is also called "wall signal". Indeed, the chamber comprises walls made of a solid material which also absorbs the modulated light. The chamber also comprises inlet and outlet windows made of a material transparent to the light radiation of the light source; however, the inlet and outlet windows are also responsible for the appearance of a wall signal if their material is imperfectly transparent to the light radiation of the light source. The interaction of the light with the solid material then creates a photoacoustic signal according to two processes:
- a thermal effect, due to heating by the walls of a layer of gas close to the walls, and
- an acoustic effect, due to the movement of the walls under the effect of their heating and thus their periodic expansion. This acoustic effect is negligible for very opaque walls, for example metal walls, which only absorb the radiation in a very thin layer of their surface.

The photoacoustic wall signal is phase shifted with respect to the useful photoacoustic signal due to the gas, but it is at the same frequency as it. It can thus not be eliminated by a synchronous detection technique, slaved to the modulation of the laser source, processing the signal measured by the microphone.

To overcome the wall signal in a photoacoustic device for detecting gas, it is known to use a collimated light beam and a gas confinement chamber having inlet and outlet windows made of a material transparent to the wavelength of the light beam considered. FIG. 1 thus shows a photoacoustic device 1 for detecting gas according to the prior art. The photoacoustic device 1 comprises a chamber having a wall P defining a confined space C. A light source S, which emits a collimated light beam, is arranged at the level of a first end of the chamber in order that the collimated light beam is aligned with the cavity of the chamber. A first window F1 transparent for the collimated light beam is arranged at a first end of the chamber and a second window F2 transparent for the collimated beam is arranged at a second end of the chamber. The collimated light beam can thus penetrate into the cavity of the chamber through the first transparent window F1 and come out therefrom through the second transparent window F2. A gas to study is introduced into the cavity C. A microphone M is provided to measure a photoacoustic signal. Since the light beam is collimated and aligned with the chamber, it traverses the cavity C without reaching its walls P, which makes it possible to eliminate the wall signal.

Such a device is however mono-passage, that is to say that the light beam traverses the cavity only once. Put another way, the length of interaction of the collimated light beam with the gas to study is equal to the length L of the cavity C. This has the drawback of reducing the useful photoacoustic signal, which is all the lower the smaller the interaction length.

The application FR 3 017 950-A1 describes, in its first, second, third, fourth, fifth, seventh and eighth embodiments, multi-passage configurations in which the collimated light beam does not reach the walls of the cavity, thanks to a system of mirrors. These configurations make it possible to increase the interaction length while eliminating the wall signal. However, these configurations implement a resonant tank of macroscopic dimensions, around a square with 10 cm sides. They are not transposable to photoacoustic devices of smaller size, for which collimation is difficult, the system of mirrors being difficult to produce and position.

It is noted that a sixth embodiment is also described in the application FR 3 017 950-A1, which proposes a multi-passage configuration in which the light beam is reflected on the walls of the cavity: the sixth embodiment increases the interaction length but generates a wall signal.

SUMMARY OF THE INVENTION

A solution is thus sought to increase the interaction length while eliminating the wall signal in a photoacoustic device for detecting gas, the solution being notably applicable to photoacoustic devices of small size.

An aspect of the invention relates to a photoacoustic device for detecting gas comprising:
- a photoacoustic cavity having a side wall extending between a first end and a second end and having an inner surface and an outer surface;
- a light source suitable for emitting a light radiation supplying an excitation energy to a gas contained in the photoacoustic cavity, the light radiation being modulated at a pulse w, the light source being coupled to the first end of the photoacoustic cavity;

a microphone coupled to the side wall of the photoacoustic cavity,
in which:
the photoacoustic cavity is made of a material transparent to the light radiation of the light source selected from silica, silicon, germanium, indium phosphide or aluminium nitride;
a mirror is arranged on at least one portion of the outer surface of the side wall of the photoacoustic cavity;
the side wall of the photoacoustic cavity has a thickness which is chosen as a function of the depth of penetration of a thermal wave coming from the mirror into said transparent material, in such a way that such a thermal wave is attenuated before arriving within the cavity.

Within the scope of the invention, the photoacoustic cavity is constructed in a material transparent to the light radiation of the light source. Thus, this makes it possible for the light radiation to reach an inner surface of the side wall without the material of the photoacoustic cavity absorbing the light radiation and thus without the material of the photoacoustic cavity heating up. By arranging a mirror on at least one portion of the outer surface of the side wall of the photoacoustic cavity, a confinement of the radiation in the photoacoustic cavity and thus a multi-passage configuration are enabled. The depth of penetration of a thermal wave coming from the mirror into said transparent material is taken into account in order to choose a sufficient thickness of the side wall of the photoacoustic cavity to attenuate such a thermal wave. Thus, a heating of the mirror by the light radiation is transmitted locally, in the form of a thermal wave, to the transparent material of the side wall in contact with said mirror, but is partially or completely attenuated in the thickness of said side wall. The photoacoustic cavity thus only undergoes negligible wall heating or no wall heating at all.

The photoacoustic device for detecting gas according to an aspect of the invention thus makes it possible to increase the length of interaction of the light radiation with a gas contained in the photoacoustic cavity, without requiring collimation of the light radiation and without using a non-miniaturisable system of mirrors with complex geometry and/or positioning. The photoacoustic device for detecting gas according to an aspect of the invention thus enables the use of a miniature photoacoustic cavity, even if the use of a photoacoustic cavity of larger dimensions remains possible. Miniature photoacoustic cavity is taken to mean a photoacoustic cavity of length less than or equal to 5 cm, preferentially less than or equal to 3 cm, even more preferentially less than or equal to 2 cm, even more preferentially less than or equal to 1 cm.

Apart from the characteristics that have been mentioned in the preceding paragraph, the photoacoustic device according to an aspect of the invention may have one or more complementary characteristics among the following, considered individually or according to all technically possible combinations thereof:

The side wall advantageously has a thickness e12 which is such that:

$e12 \geq \delta$

Indeed, the amplitude of a thermal wave decreases on propagating in a material and it is observed that a thermal wave coming from the mirror and propagating in the transparent material of the side wall undergoes an attenuation in amplitude of 1−exp(−1) i.e. around 63% before arriving in the cavity, for a distance of propagation of $\delta$ in the transparent material of the side wall.

The thickness e12 of the side wall is even more advantageously such that:

$e12 \geq 2\pi\delta$

Indeed, it is observed that a thermal wave coming from the mirror and propagating in the transparent material of the side wall undergoes an attenuation in amplitude of 1−exp(−2π), i.e. around 99.8% before arriving in the cavity, for a distance of propagation of $2\pi\delta$ in the transparent material of the side wall.

Furthermore, the thickness e12 of the side wall is preferentially such that:

$e12 \leq 10\delta$

Indeed, it is not useful that the thickness e12 of the side wall is greater than 10δ because, beyond this thickness, the attenuation is quasi-total or total and is no longer improved significantly or not at all. It is thus preferred not to increase the thickness e12 of the side wall beyond 10δ to conserve the most miniature possible photoacoustic cavity.

The outer surface of the side wall of the photoacoustic cavity being of parallelepiped shape and thus having four faces, the mirror is preferentially arranged, according to a first configuration, on two opposite faces of the outer surface of the side wall of the photoacoustic cavity. Indeed, when two opposite outer faces are thus covered with a mirror, optical ray tracing calculations have shown a significant improvement of the order of 15% of the useful photoacoustic signal compared to a mono-passage configuration, without increase in the parasitic wall signal thanks to the thermal decoupling.

According to a second configuration, the mirror is preferentially arranged on each of the four faces of the outer surface of the side wall of the photoacoustic cavity. Indeed, when the four outer faces are thus covered with a mirror, optical ray tracing calculations have shown a significant improvement of the order of 80% of the useful photoacoustic signal compared to a mono-passage configuration, without increase in the parasitic wall signal thanks to the thermal decoupling.

According to an improvement of the first configuration, the mirror is arranged on the two horizontal faces of the outer surface of the side wall of the photoacoustic cavity and a second mirror is arranged parallel, at a distance equal to the thickness e12, to the two vertical faces of the outer surface of the side wall of the photoacoustic cavity. This improvement makes it possible to obtain a significant improvement of the order of 80% of the useful photoacoustic signal without increase in the parasitic wall signal as in the second configuration, while being compatible with manufacture by micro electro mechanical system MEMS manufacturing technology.

The photoacoustic cavity preferentially comprises a first antireflective layer arranged on at least one portion of the outer surface of its first end, and/or a second antireflective layer arranged on at least one portion of the inner surface of its first end.

The light source preferentially emits a light radiation having a divergence greater than or equal to 20°.

The light source is preferentially a quantum cascade laser QCL source.

The photoacoustic cavity has a length, measured between the inner surfaces of the first and second ends, less than 5 cm, preferentially less than 3 cm, more preferentially less than 2 cm, even more preferentially less than 1 cm.

According to an alternative embodiment, the photoacoustic device comprises:
- a first photoacoustic cavity, a second photoacoustic cavity and first and second capillaries enabling the volumes of the first and second photoacoustic cavities to communicate with each other so as to form a resonant photoacoustic cavity of differential Helmholtz type;
- the light source coupled to the first photoacoustic cavity;
- a first microphone coupled to the first photoacoustic cavity and a second microphone coupled to the second photoacoustic cavity.

The photoacoustic device according to the alternative embodiment preferentially comprises an inlet channel making it possible to bring the gas into the first and second photoacoustic cavities via the first capillary and an outlet channel making it possible to evacuate the gas outside of the first and second photoacoustic cavities via the second capillary.

Another aspect of the invention relates to a method for manufacturing a photoacoustic device according to an aspect of the invention, comprising the following steps:
- a first step according to which a first half-cavity is etched in a first wafer of a transparent material and a second half-cavity is etched in a second wafer of the transparent material;
- a third step according to which the first and second etched wafers are assembled so as to form, from the first and second half-cavities, a whole photoacoustic cavity having a first end, a second end and a side wall between the first and second ends, the side wall having an inner surface and an outer surface;
- a fourth step according to which a mirror is deposited on the outer surface of the side wall of the photoacoustic cavity;
- a fifth step according to which the mirror is structured by local etching so as to create in the mirror at least a first structuring, a second structuring and a third structuring;
- a sixth step according to which the side wall of the photoacoustic cavity is structured by deep etching directly in line with the first and second structurings of the mirror, so as to form a first opening directly in line with the first structuring, a second opening directly in line with the second structuring and a third opening directly in line with the third structuring, the first, second and third openings emerging into the photoacoustic cavity.

The manufacturing method according to an aspect of the invention may further comprise, prior to the first step:
- a first sub-step according to which a first trench is etched in the first wafer and a second trench is etched in the second wafer, and
- a second sub-step according to which a layer of a reflector is deposited on the first and second wafers so as to fill the first and second trenches, then a chemical mechanical planarization is carried out in order to only conserve the reflector filling the first and second trenches.

The invention and its different applications will be better understood on reading the description that follows and by examining the figures that accompany it.

BRIEF DESCRIPTION OF THE FIGURES

The figures are presented for indicative purposes and in no way limit the invention.

FIG. 1 shows a schematic representation of a photoacoustic device for detecting gas according to the prior art.

FIG. 2a shows a schematic representation of a photoacoustic device for detecting gas according to an embodiment of the invention, comprising a photoacoustic cavity of any type, used at its resonance frequency.

FIG. 5a' is a schematic view in perspective and in section of a photoacoustic cavity of parallelepiped geometry according to an improvement of the first configuration of FIG. 5a.

FIGS. 9a1', 9a2', 9a1", and 9a2" show first and second optional sub-steps of the manufacturing method of FIG. 8, according to which a U-shaped trench is etched, which is filled with a reflector.

FIGS. 9b1 and 9b2 show a first step of the manufacturing method of FIG. 8, according to which first and second half-cavities are etched.

FIGS. 9b1' and 9b2' show respectively a top view of FIGS. 9b1 and 9b2, when the optional step of FIGS. 9a1', 9a2', 9a1", 9a2" has been carried out.

DETAILED DESCRIPTION OF AT LEAST ONE EMBODIMENT OF THE INVENTION

Figure 2B:
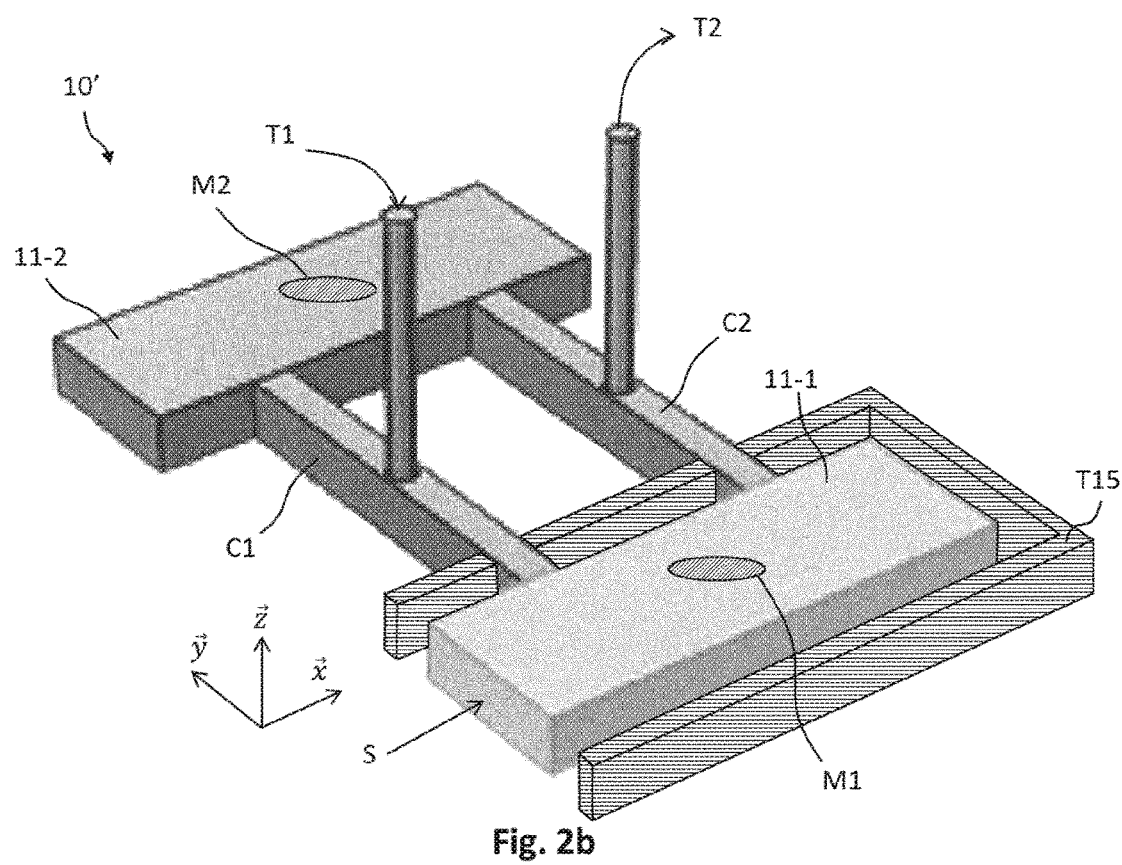
FIG. 2b shows a schematic representation of a photoacoustic device for detecting gas according to an alternative embodiment of the invention, comprising a resonant photoacoustic cavity of differential Helmholtz type.

Unless stated otherwise, a same element appearing in the different figures has a single reference.

An axis marker $\vec{x}$, $\vec{y}$, $\vec{z}$ is regularly represented in the figures in order to define their orientation and to make them easier to read.

FIG. 1, which shows a schematic representation of a photoacoustic device 1 for detecting gas according to the prior art, has been described previously.

FIG. 2a shows a schematic representation of a photoacoustic device 10 for detecting gas according to an embodiment of the invention. The photoacoustic device 10 comprises a light source S, a photoacoustic cavity 11 and a microphone M.

The light source S is suitable for emitting a light radiation modulated at a pulse w and supplying an excitation energy to a gas contained in the photoacoustic cavity 11. The light source S is typically a laser light source. The light source S may have a considerable divergence, typically greater than or equal to 20°, or even greater than or equal to 30°, or even greater than or equal to 40°. The light source S is preferentially a quantum cascade laser QCL source, which typically has a divergence of the order of 40°. A light source emitting a near- or mid-infrared radiation is generally chosen. A near-infrared radiation has a wavelength comprised between 0.78 and 3 µm, whereas a mid-infrared radiation has a wavelength comprised between 3 and 20 µm.

The photoacoustic cavity 11 is made of a material transparent to the light radiation emitted by the light source S and comprises a first end 13, a second end 14 and a side wall 12 extending between the first and second ends 13, 14. The light source S is coupled with one of the first or second ends 13, 14: in the example of FIG. 2a, the light source S is coupled with the first end 13. The side wall 12 is typically perpendicular to the first and second ends 13, 14. As represented in FIGS. 3a, 3b and 3c, the side wall 12 has an inner surface 12a, an outer surface 12b. The side wall 12 has a thickness e12 measured between its inner 12a and outer 12b surfaces, perpendicularly to said inner 12a and outer 12b surfaces. The first end 13 has an inner surface 13a and an outer surface 13b; the second end 14 has an inner surface 14a and an outer surface 14b. The first end has a thickness e13 measured between its inner 13a and outer 13b surfaces, perpendicularly to said inner 13a and outer 13b surfaces. The second end has a thickness e14 measured between its inner 14a and outer 14b surfaces, perpendicularly to said inner 14a and outer 14b surfaces.

A mirror 15 is arranged on at least one portion of the outer surface 12b of the side wall 12. The mirror 15 is for example a metal layer. A mirror may also by arranged on all or part of the outer surface 13b of the first end and/or on all or part of the outer surface 14b of the second end.

An antireflective layer may advantageously be arranged on the outer surface 13b of the first end 13 of the photoacoustic cavity 11 which is coupled with the light source S, so as to avoid a loss of light radiation at the interface between the external medium, typically the ambient air, and the first end 13 of the photoacoustic cavity 11 made of transparent material. For example, in the absence of antireflective layer, 30% of the light radiation incident on an air/silicon interface is reflected, thus lost.

Generally speaking, the material transparent to the light radiation emitted by the light source S may be any material transparent to the wavelength of interest. For a wavelength of interest less than 3.5 µm, or even less than 2 µm, the transparent material is preferentially silica. Indeed, silica is transparent to the infrared radiation as defined previously while being compatible with micro electro mechanical system MEMS manufacturing technologies. For a wavelength of interest in the interval [1 µm; 10 µm], the transparent material is preferentially silicon Si. Indeed, silicon is transparent to the infrared radiation as defined previously while being compatible with micro electro mechanical system MEMS manufacturing technologies. For a wavelength of interest in the interval [2 µm; 17 µm], the transparent material is preferentially germanium. Indeed, germanium is transparent to the infrared radiation as defined previously while being compatible with micro electro mechanical system MEMS manufacturing technologies. For a wavelength of interest in the interval [2 µm; 10 µm], the transparent material is preferentially indium phosphide InP. Indeed, indium phosphide InP is transparent to the radiation as defined previously while being compatible with micro electro mechanical system MEMS manufacturing technologies. For a wavelength of interest in the interval [2 µm; 7 µm], the transparent material is preferentially aluminium nitride AlN. Indeed, aluminium nitride AlN is transparent to the radiation as defined previously while being compatible with micro electro mechanical system MEMS manufacturing technologies.

The side wall 12 has an opening with which the microphone M is coupled. The opening is preferentially arranged in the middle of the photoacoustic cavity 11, that is to say at equal distance from these first and second ends 13, 14, because, in a standard non-resonant cavity, this positioning corresponds to a pressure antinode of the fundamental mode of the acoustic wave. In a Helmholtz type resonant cavity, the pressure is uniform and the positioning of the opening for the coupling of the microphone is indifferent, however in practice a positioning of the microphone in the middle of the resonant cavity is typically conserved.

Figure 3A:
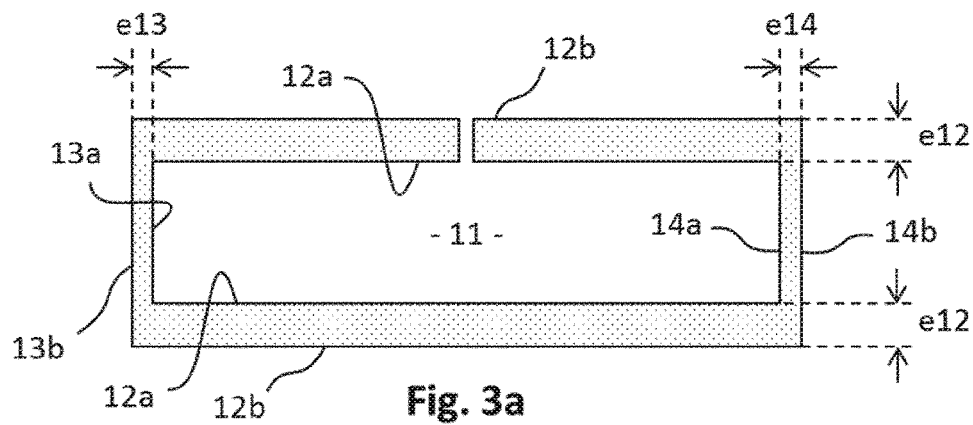
FIG. 3a shows a schematic representation of a first embodiment of a photoacoustic cavity of the photoacoustic device of FIG. 2a, in which thermal decoupling is enabled by a side wall of the photoacoustic cavity.
Figure 3B:
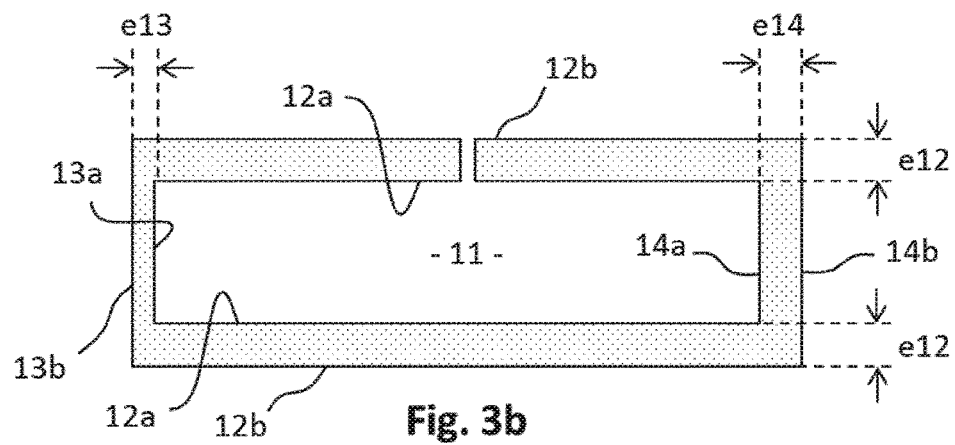
FIG. 3b shows a schematic representation of a second embodiment of the photoacoustic cavity of the photoacoustic device of FIG. 2a, in which thermal decoupling is enabled by the side wall and by an end of the photoacoustic cavity.
Figure 3C:
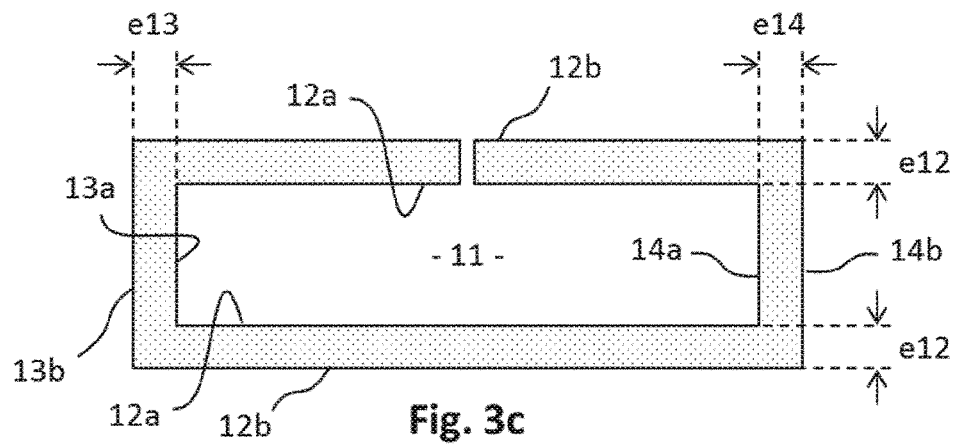
FIG. 3c shows a schematic representation of a third embodiment of the photoacoustic cavity of the photoacoustic device of FIG. 2a, in which thermal decoupling is enabled by the side wall and by the first and second ends of the photoacoustic cavity.

FIG. 2b shows a schematic representation of a photoacoustic device 10' for detecting gas according to an alternative embodiment of the invention. The photoacoustic device 10' comprises:
- the light source S
- a first photoacoustic cavity 11-1;
- a second photoacoustic cavity 11-2;
- first and second capillaries C1 and C2 enabling the volumes of the first and second photoacoustic cavities 11-1 and 11-2 to communicate with each other, so as to form a resonant photoacoustic cavity of differential Helmholtz type 11';
- a first microphone M1 and a second microphone M2.

The photoacoustic device 10' preferentially comprises an inlet channel T1 making it possible to bring the gas into the first and second photoacoustic cavities 11-1 and 11-2 via the first capillary C1, and an outlet channel T2 making it possible to evacuate the gas outside of the first and second photoacoustic cavities 11-1 and 11-2 via the second capillary C2. The source S is coupled to the first photoacoustic cavity 11-1. The gas to detect is intended to be excited, in the first photoacoustic cavity 11-1, by the light beam emitted by the source S. Each of the first and second photoacoustic cavities 11-1, 11-2 may be coupled to one or more microphones. In the example of FIG. 6, the first photoacoustic cavity 11-1 is coupled to the first microphone M1 and the second photoacoustic cavity 11-2 is coupled to the second microphone M2. A mirror T15 may advantageously be arranged around the first photoacoustic cavity 11-1; this point is described in greater detail hereafter, in relation to FIG. 5a'.

FIGS. 3a, 3b and 3c show first, second and third possible embodiments of the photoacoustic cavity 11 of the photoacoustic device 10 of FIG. 2a, each making it possible to obtain a decoupling between the mechanical function of confinement of the gas and the acoustic wave and the optical function of confinement of the light radiation.

According to the first embodiment of FIG. 3a, the thickness e12 of the side wall 12 is chosen as a function of the depth of penetration δ of a thermal wave coming from the mirror 15 into the transparent material of the side wall 12, in such a way that such a thermal wave is attenuated before arriving within the cavity 11. The depth of penetration δ is defined by:

$$\delta = \sqrt{2\alpha/\omega}$$

where α is the thermal diffusivity of the transparent material of the side wall 12 and ω the pulse of the light source S.

The thickness e12 is preferentially such that:

$$\delta \leq e12$$

Indeed, the amplitude of a thermal wave decreases in propagating in a material and it is observed that a thermal wave coming from the mirror 15 and propagating in the transparent material of the side wall 12 undergoes an attenuation in amplitude of $1-\exp(-1)$, i.e. around 63% before arriving in the cavity 11, for a distance of propagation of δ in the transparent material of the side wall 12.

The thickness e12 is more preferentially such that:

$$2\pi\delta \leq e12$$

Figure 6:
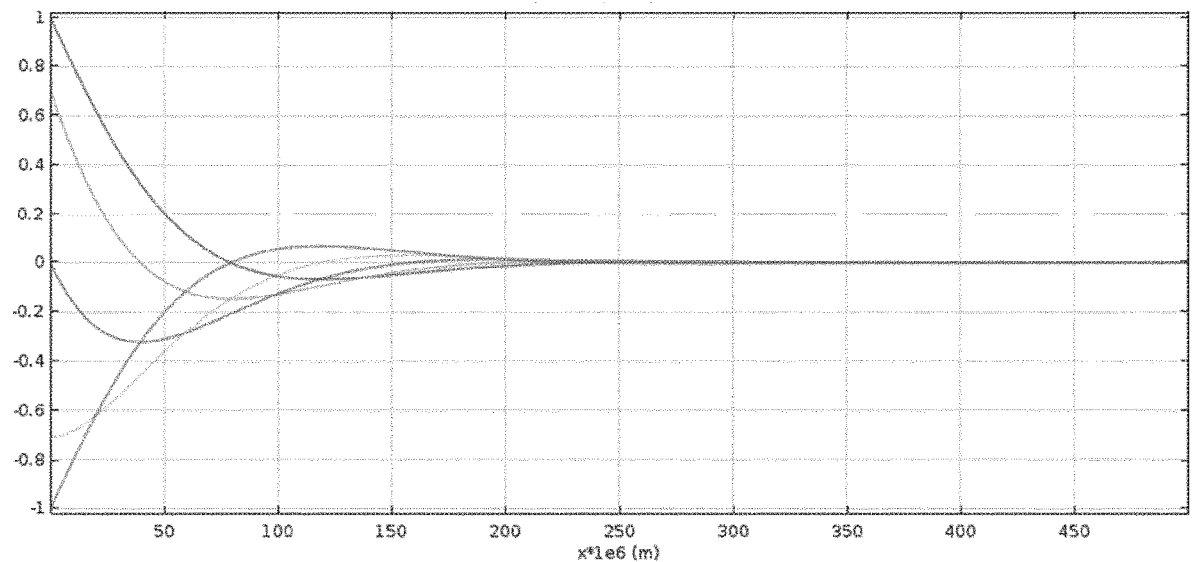
FIG. 6 is a graph of the change in temperature of a material heated at its surface, as a function of the depth of the material.
Figure 7:
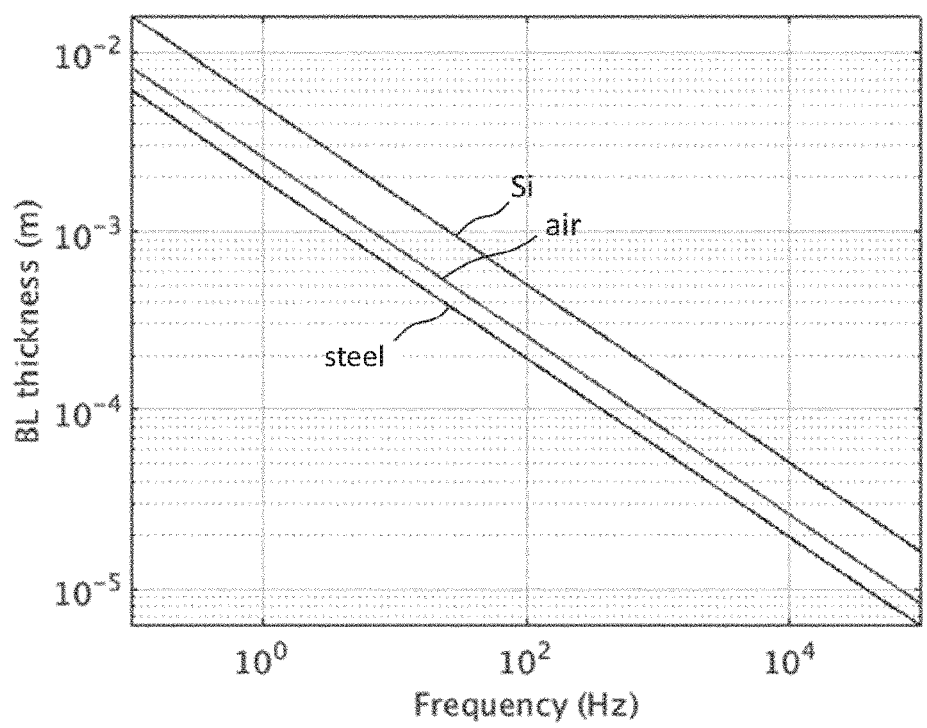
FIG. 7 is a graph of the change in a thermal wave within different materials, as a function of the frequency of a heat source heating said materials.

Indeed, it is observed that a thermal wave coming from the mirror 15 and propagating in the transparent material of the side wall 12 undergoes an attenuation in amplitude of $1-\exp(-2\pi)$, i.e. around 99.8% before arriving in the cavity 11, for a distance of propagation of $2\pi\delta$ in the transparent material of the side wall 12. FIG. 6 is a graph of the change in temperature of a material heated on its surface, as a function of the depth in the material. It is observed that beyond a certain depth, the temperature does not vary. FIG. 7 is a graph of the change in the depth of penetration of a thermal wave within different materials, namely air, silicon and steel, as a function of the frequency of a heat source heating said materials. It is observed that the more the frequency of the heat source increases, the more the depth of penetration decreases.

It is not useful that the thickness e12 of the side wall 12 is greater than 10δ because, beyond this thickness, the attenuation is quasi-total or total and does not improve more significantly or at all. It is thus preferred not to increase the thickness e12 of the side wall 12 beyond 10δ in order to conserve the most miniature possible photoacoustic cavity 11. The thickness e12 of the side wall 12 is thus preferentially such that:

$$e12 \leq 10\delta$$

Still according to the first embodiment, the thickness e13 of the first end 13 and the thickness e14 of the second end 14 are less than the thickness e12 of the side wall 12. The thicknesses e13, e14 of the first and second ends 13, 14 are typically identical but may also be distinct. According to the first embodiment, preferentially no mirror is arranged on the outer surface 13b of the first end 13, which forms the inlet window, and preferentially no mirror is arranged on the outer surface 14b of the second end 14, which forms the outlet window.

According to the second embodiment of FIG. 3b, both the thickness e12 of the side wall 12 and the thickness e14 of the second end e14 are chosen as a function of the depth of penetration δ of a thermal wave coming from the mirror 15 into the transparent material of the side wall 12, in such a way that such a thermal wave is attenuated before arriving within the cavity 11. According to the second embodiment, the thickness e12 of the side wall 12 and the thickness e14 of the second end e14 are typically identical but may also be distinct.

For the same reasons as detailed previously in relation to the first embodiment, the thickness e12 of the side wall and the thickness e14 of the second end 14 are preferentially such that:

$$\delta \leq e12; \delta \leq e14$$

and more preferentially such that:

$$2\pi\delta \leq e12; 2\pi\delta \leq e14$$

Furthermore, for the same reasons as detailed previously in relation to the first embodiment, the thickness e12 of the side wall and the thickness e14 of the second end 14 are preferentially such that:

$$e12 \leq 10\delta; e14 \leq 10\delta$$

Still according to the second embodiment, the thickness e13 of the first end 13 is less than the thickness e12 of the side wall 12 and the thickness e14 of the second end 14. According to the second embodiment, preferentially no mirror is arranged on the outer surface 13b of the first end 13 which forms the inlet window, and a mirror is preferentially arranged on the outer surface 14b of the second end 14, which is thus not an outlet window. Compared to the first embodiment, an increase in the optical path traveled by the light radiation within the photoacoustic cavity is thus enabled.

According to the third embodiment of FIG. 3c, both the thickness e12 of the side wall 12, the thickness e13 of the first end 13 and the thickness e14 of the second end e14 are chosen as a function of the depth of penetration δ of a thermal wave coming from the mirror 15 into the transparent material of the side wall 12, in such a way that such a thermal wave is attenuated before arriving within the cavity 11.

According to the third embodiment, the thickness e12 of the side wall 12 and the thicknesses e13, e14 of the first and second ends 13, 14 are typically identical but may also be distinct.

For the same reasons as detailed previously in relation to the first embodiment, the thickness e12 of the side wall and the thicknesses e13, e14 of the first and second ends 13, 14 are preferentially such that:

$$\delta \leq e12; \delta \leq e13; \delta \leq e14$$

and more preferentially such that:

$$2\pi\delta \leq e12; 2\pi\delta \leq e13; 2\pi\delta \leq e14$$

Furthermore, for the same reasons as detailed previously in relation to the first embodiment, the thickness e12 of the side wall and the thicknesses e13, e14 of the first and second ends 13, 14 are preferentially such that:

$$e12 \leq 10\delta; e13 \leq 10\delta; e14 \leq 10\delta$$

According to the third embodiment, a mirror is preferentially arranged on a portion of the outer surface 13*b* of the first end 13 and a mirror is preferentially arranged on the outer surface 14*b* of the second end 14. The mirror is not arranged on the whole outer surface 13*b* of the first end 13 in such a way that the light source S remains coupled with the first end 13, for the introduction of the light radiation into the photoacoustic cavity. Compared to the first and second embodiments, an increase in the optical path traveled by the light radiation within the photoacoustic cavity is thus obtained.

In each of the first, second and third embodiments that have been described in relation with FIGS. 3*a*, 3*b* and 3*c*, the first end 13 and/or the second end 14 may be transferred onto the device, that is to say that they may be produced independently of the side wall of the cavity then fixed, for example bonded, on either side of the side wall of the cavity. This can have an interest in order to produce the first end 13 and/or the second end 14 in a material distinct from the material of the side wall of the cavity. For example, the first end 13 and/or the second end 14 may be made of $BaF_2$ whereas the side wall is made of another material such as silica, silicon or germanium. This can also have an interest in order to equip directly the first end 13 and/or the second end 14 of an antireflective layer.

The first, second and third embodiments, as well as the alternative according to which the first end and/or the second end are transferred onto the device, have been described for the photoacoustic cavity 11 of the photoacoustic device 10 of FIG. 2*a* but are also compatible with each of the first and second photoacoustic cavities 11-1, 11-2 of the photoacoustic device 10' of FIG. 2*b*.

Figure 4A:
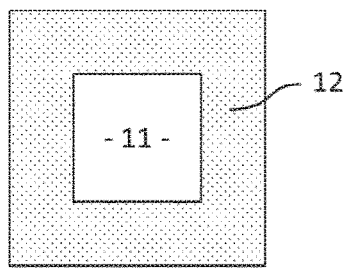
FIG. 4a is a sectional view which shows an example of parallelepiped geometry for the photoacoustic cavity of FIG. 3a, 3b or 3c.
Figure 4B:
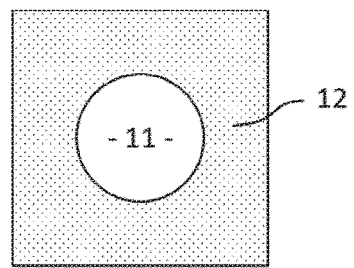
FIG. 4b is a sectional view which shows an example of cylindrical geometry for the photoacoustic cavity of FIG. 3a, 3b or 3c.

The photoacoustic device 10 according to the embodiment described in relation to FIG. 2*a* is preferentially obtained by micro electro mechanical system (MEMS) manufacturing technology. Such a manufacturing method is described hereafter. MEMS technology notably makes it possible to obtain a photoacoustic cavity of parallelepiped shape. FIG. 4*a* shows a sectional view, along a section A-A represented in FIG. 3*a*, of an example of parallelepiped geometry for the photoacoustic cavity 11. MEMS technology also makes it possible to obtain a photoacoustic cavity of cylindrical shape. FIG. 4*b* shows a sectional view, along the section A-A, of an example of cylindrical geometry for the photoacoustic cavity 11. According to the micro electro mechanical system MEMS manufacturing technology, the photoacoustic cavity is etched in wafers, which is why the outer shape remains parallelepiped even when the inner cavity is of cylindrical geometry. The inner cavity of cylindrical geometry being typically obtained by isotropic chemical etching of a crystalline material such as silicon, the cylinder obtained is not perfect. A more regular cylindrical geometry may be obtained thanks to machining or 3D printing technologies. Cylindrical geometry has the advantage of being acoustically more favourable than parallelepiped geometry. Parallelepiped geometry has the advantage of being obtained according to a simpler MEMS method than for cylindrical geometry. The geometry examples of FIGS. 4*a* and 4*b* are also valid for the first and second photoacoustic cavities 11-1, 11-2, forming the resonant photoacoustic cavity of differential Helmholtz type 11' of the photoacoustic device 10'.

The photoacoustic device 10' according to the alternative embodiment described in relation to FIG. 2*b* is also preferentially obtained by micro electro mechanical system MEMS manufacturing technology, such as described above. Each of the first and second photoacoustic cavities 11-1 and 11-2 of the resonant photoacoustic cavity of differential Helmholtz type 11' may in particular have a parallelepiped geometry, such as illustrated in FIG. 4*a*, or cylindrical, such as illustrated in FIG. 4*b*.

Independently of the inner geometry of the photoacoustic cavity 11, the side wall 12 of the photoacoustic cavity 11 has a parallelepiped profile with an outer surface 12*b* having four outer faces 12*b*1, 12*b*2, 12*b*3 and 12*b*4 and the mirror 15 is preferentially arranged on at least two opposite outer faces, and even more preferentially arranged on each of the four outer faces.

Figure 5A:
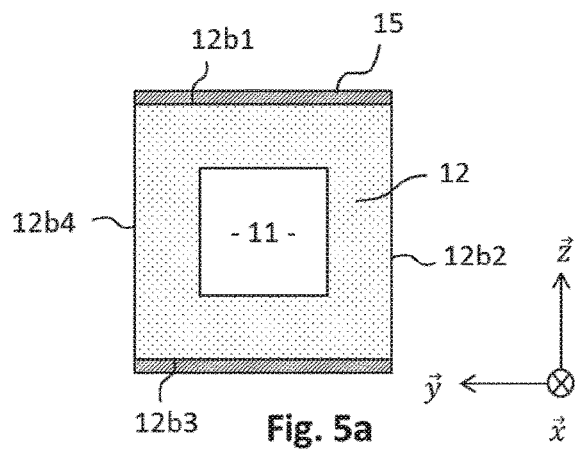
FIG. 5a is a schematic view in section of a photoacoustic cavity of parallelepiped geometry, in a first configuration according to which a mirror is arranged on two opposite outer faces of the side wall of the photoacoustic cavity.

FIG. 5*a* thus shows an example of a configuration in which the first and third outer faces 12*b*1, 12*b*3 are covered by the mirror 15, whereas the second and fourth outer faces 12*b*2, 12*b*4 are not covered by the mirror 15. This configuration is compatible with any type of inner geometry, parallelepiped or cylindrical, for the photoacoustic cavity 11 thus with each embodiment of FIGS. 3*a*, 3*b* and 3*c*. When two opposite outer faces are thus covered with a mirror, optical ray tracing calculations have shown a significant improvement of the order of 15% of the useful photoacoustic compared to a mono-passage configuration, without increase in the parasitic wall signal thanks to the thermal decoupling. The exemplary configuration of FIG. 5*a*, described for the photoacoustic cavity 11 of the photoacoustic device 10 of FIG. 2*a*, is also compatible with each of the first and second photoacoustic cavities 11-1, 11-2 of the photoacoustic device 10' of FIG. 2*b*.

Figure 5B:
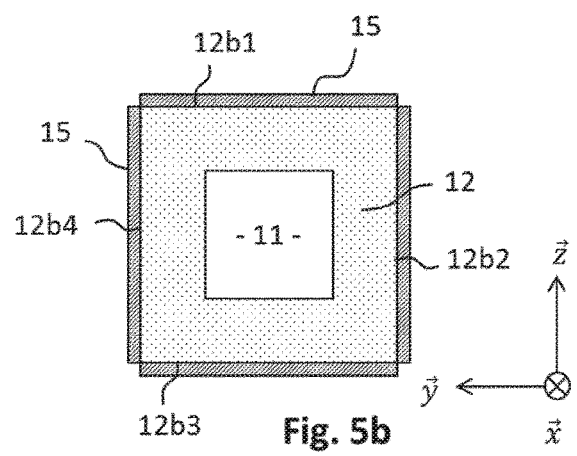
FIG. 5b is a schematic view in section of a photoacoustic cavity of parallelepiped geometry, in a second configuration according to which a mirror is arranged on the four outer faces of the side wall of the photoacoustic cavity.
Figure 5A:
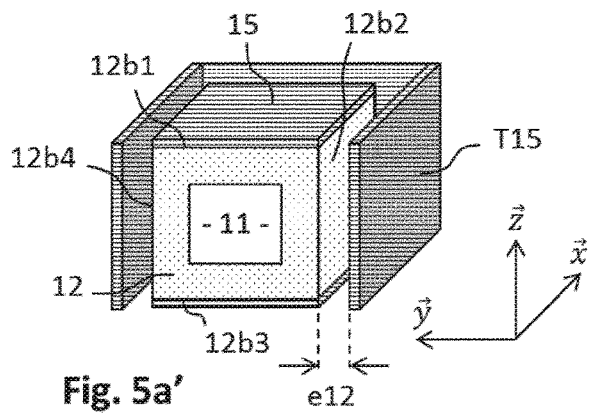

FIG. 5*b* shows an example of a configuration in which, in addition to the first and third outer faces 12*b*1, 12*b*3, the second and fourth outer faces 12*b*2, 12*b*4 are also covered by the mirror 15. The second end 14 may also be covered by the mirror 15. This configuration is compatible with any type of inner geometry, parallelepiped or cylindrical, for the photoacoustic cavity 11 as well as with each embodiment of FIGS. 3*a*, 3*b* and 3*c*. When the four outer faces are thus covered with a mirror, optical ray tracing calculations have shown a significant improvement of the order of 80% of the useful photoacoustic signal compared to a mono-passage configuration, without increase in the parasitic wall signal thanks to the thermal decoupling. The exemplary configuration of FIG. 5*b*, described for the photoacoustic cavity 11 of the photoacoustic device 10 of FIG. 2*a*, is also compatible with each of the first and second photoacoustic cavities 11-1, 11-2 of the photoacoustic device 10' of FIG. 2*b*.

The exemplary configuration of FIG. 5*b*, according to which the four outer faces 12*b*1, 12*b*2, 12*b*3, 12*b*4 of the side wall 12 are covered by the mirror 15, may for example be manufactured by a 3D printing technique, but not by micro electro mechanical system MEMS manufacturing technology. FIG. 5*a*' shows an improvement of the first configuration of FIG. 5*a*, enabling a significant improvement of the order of 80% of the useful photoacoustic signal compared to a mono-passage configuration without increase in the parasitic wall signal thanks to thermal decoupling, and being able to be manufactured by micro electro mechanical system MEMS manufacturing technology. According to this improvement, in addition to the mirror 15 covering the first and third horizontal faces 12*b*1, 12*b*3 of the outer surface 12*b*, a mirror T15 is arranged parallel, at a distance measured along the axis 5 equal to the thickness e12, to the vertical faces 12*b*2 and 12*b*4 of the outer surface 12*b* of the side wall 12. The mirror T15 may also be arranged parallel, at a distance measured along the axis z equal to the thickness e12, to the second vertical end 14: in this case, it has a U shape. This improvement is also compatible with each of the first and second photoacoustic cavities 11-1, 11-2 of the photoacoustic device 10' of FIG. 2b—in particular the first photoacoustic cavity 11-1, as illustrated in FIG. 2b.

Figure 8:
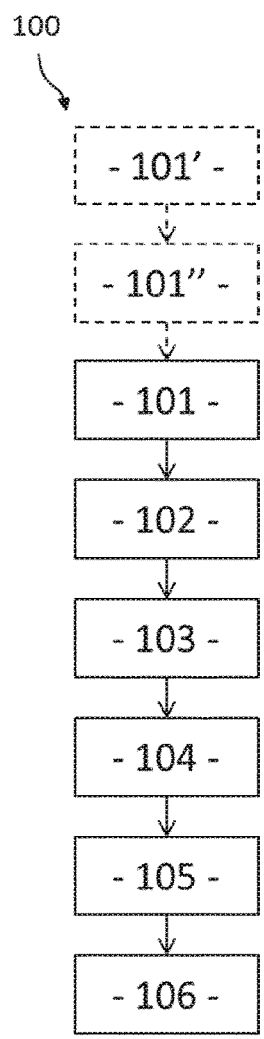
FIG. 8 shows a diagram of the steps of a method for manufacturing a photoacoustic device for detecting gas according to an aspect of the invention.

A method for manufacturing 100 a photoacoustic device conforming with an aspect of the invention by means of micro electro mechanical system MEMS manufacturing technology will now be described, in relation to FIG. 8 which shows a diagram of the different steps, and with FIGS. 9a1' to 9g which schematically illustrate the different steps. The manufacturing method 100 makes it possible to obtain a miniature photoacoustic device, having for example a photoacoustic cavity of 5 or 8 mm length, for example of parallelepiped shape with a section of 0.6 mm×0.4 mm.

According to a first optional sub-step 101' of the manufacturing method 100, represented in FIGS. 9a1' and 9a2', first and second trenches are etched, respectively in the first and second wafers g1, g2. The etching is a deep etching, for example a deep reactive ion etching (DRIE). Then according to an optional second sub-step 101" of the manufacturing method 100, represented in FIGS. 9a1" and 9a2", a layer of a reflector, for example a metal, is deposited on the first and second wafers g1, g2 so as to fill the first and second trenches, then a chemical mechanical planarization is carried out in order to only conserve the reflector T15a, T15b filling the first and second trenches.

According to a first step 101 of the manufacturing method 100, represented in FIGS. 9b1 and 9b2, a first half-cavity 11a is etched in the first wafer g1 (FIG. 9b1), and a second half-cavity 11b is etched in the second wafer g2 (FIG. 9b2).

The first and second wafers g1, g2 are made of a transparent material which may be silicon, germanium, silica, indium phosphide InP or aluminium nitride AlN. Hereafter, the example is taken where the first and second wafers g1, g2 are made of silicon. Each silicon wafer g1, g2 typically has a standard thickness of 550 µm, or alternatively a standard thickness of 725 µm. The etching is a deep etching, for example a deep reactive ion etching (DRIE). In the case of a silicon photoacoustic cavity and for a heat source of 10 kHz frequency, the depth of penetration δ is 80 µm thus a thickness of several hundreds of µm for the side wall of the photoacoustic cavity finally obtained, for example a thickness comprised between 400 and 600 µm, is suitable. If a wall thickness of 400 µm is desired, it is thus possible to use two standard silicon wafers of 550 µm thickness; if a thickness of 600 µm is desired, it is possible to use two standard silicon wafers of 725 µm thickness.

FIGS. 9b1' and 9b2' show respectively a top view of FIGS. 9b1 and 9b2, when the first and second sub-steps 101', 101" of producing a trench filled with reflector have taken place before the first step 101.

Figure 9C:
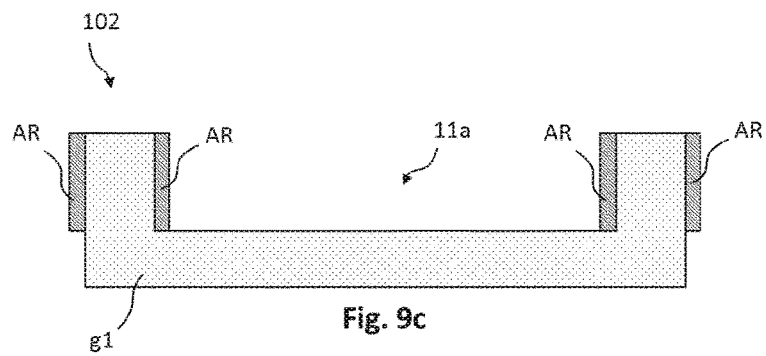
FIG. 9c shows a second step of the manufacturing method of FIG. 8.

According to a second step 102 of the manufacturing method 100, represented in FIG. 9c, an antireflective layer AR, for example a layer of silicon nitride, is preferentially deposited on the flanks of the first half-cavity 11a. The antireflective layer AR may be put in place by a conformal deposition, for example a low pressure chemical vapor deposition (LPCVD), followed by an anisotropic etching in order to remove the horizontal parts. The antireflective layer AR is preferably deposited only on the inner and outer surfaces of the end having to ensure a function of inlet window of the light radiation. The second step 102 is optional, it may not be carried out.

Figure 9D:
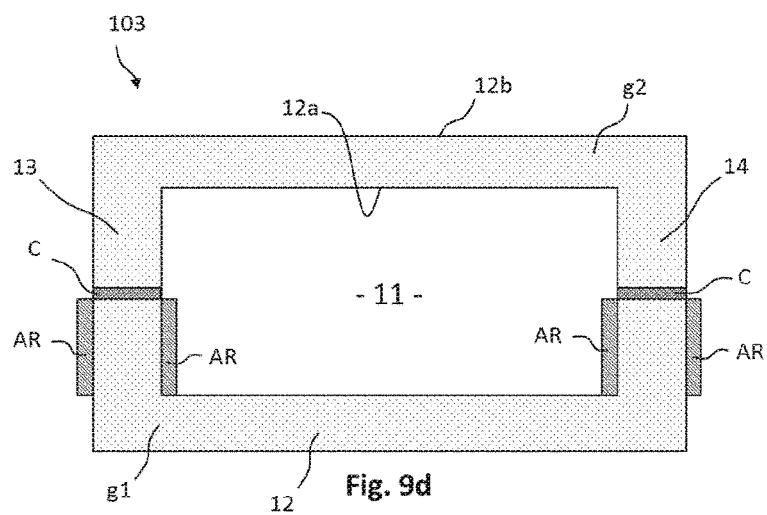
FIG. 9d shows a third step of the manufacturing method of FIG. 8.

According to a third step 103 of the manufacturing method 100, represented in FIG. 9d, the first and second etched wafers g1, g2 are assembled by molecular bonding so as to form, from the first and second half-cavities 11a and 11b, the whole photoacoustic cavity 11. Thus, as described previously, the photoacoustic cavity 11 thereby formed has the first end 13, the second end 14 and the side wall 12 between the first and second ends 13, 14. The side wall 12 has the inner surface 12a and the outer surface 12b. Molecular bonding makes it possible to achieve a sealing C between the first and second etched wafers g1, g2.

Figure 9E:
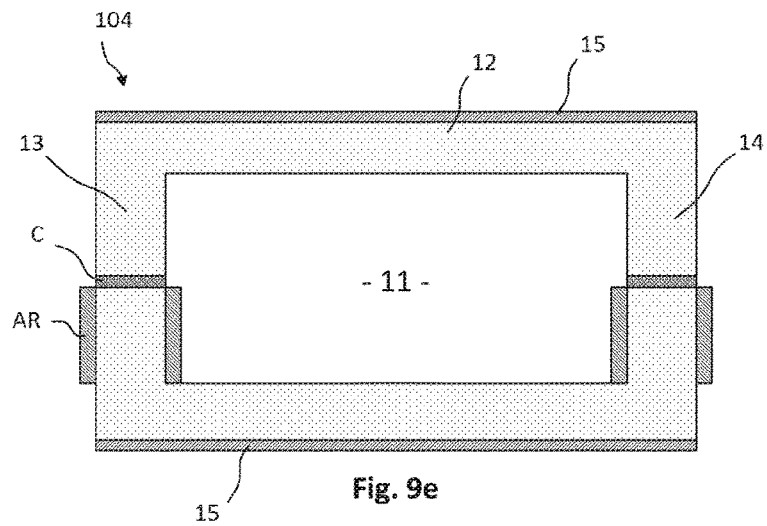
FIG. 9e shows a fourth step of the manufacturing method of FIG. 8.

According to a fourth step 104 of the manufacturing method 100, represented in FIG. 9e, the mirror 15, for example a metal layer, is deposited on the outer surface 12b of the side wall 12 of the photoacoustic cavity 11, for example by a chemical vapor deposition CVD technique, or by a physical vapor deposition PVD technique, or by a vacuum evaporation deposition technique.

Figure 9F:
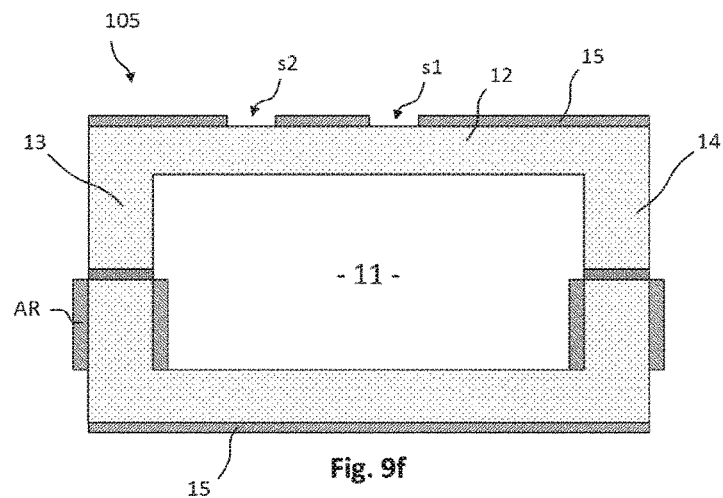
FIG. 9f shows a fifth step of the manufacturing method of FIG. 8.

According to a fifth step 105 of the manufacturing method 100, represented in FIG. 9f, the mirror 15 is structured by local etching, so as to create in the mirror 15 at least one first structuring s1, intended to produce a first opening ensuring the connection with the microphone M, a second structuring s2 intended to produce a second opening forming a gas inlet in the photoacoustic cavity, and a third structuring, not represented, intended to produce a third opening forming a gas outlet of the photoacoustic cavity. Generally speaking, at least three structurings are produced, but a greater number of structurings may easily be produced as a function notably of the number and the characteristics of each microphone: one or more structurings may for example be required to ensure electrical contact pick-ups.

Figure 9G:
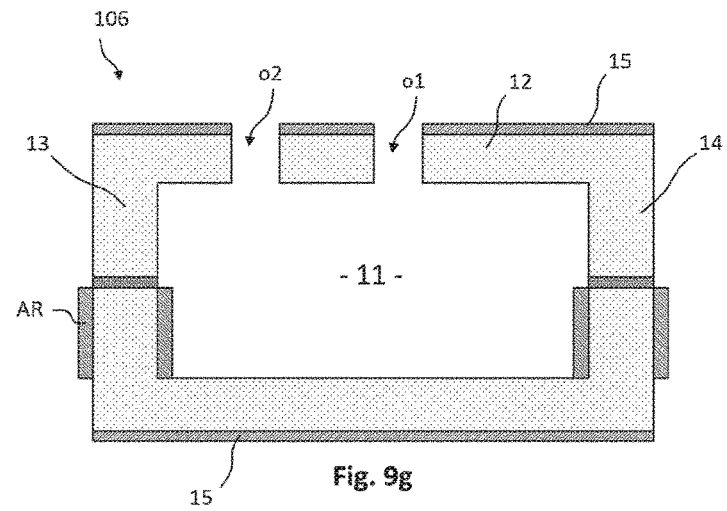
FIG. 9g shows a sixth step of the manufacturing method of FIG. 8.
Figure 10:
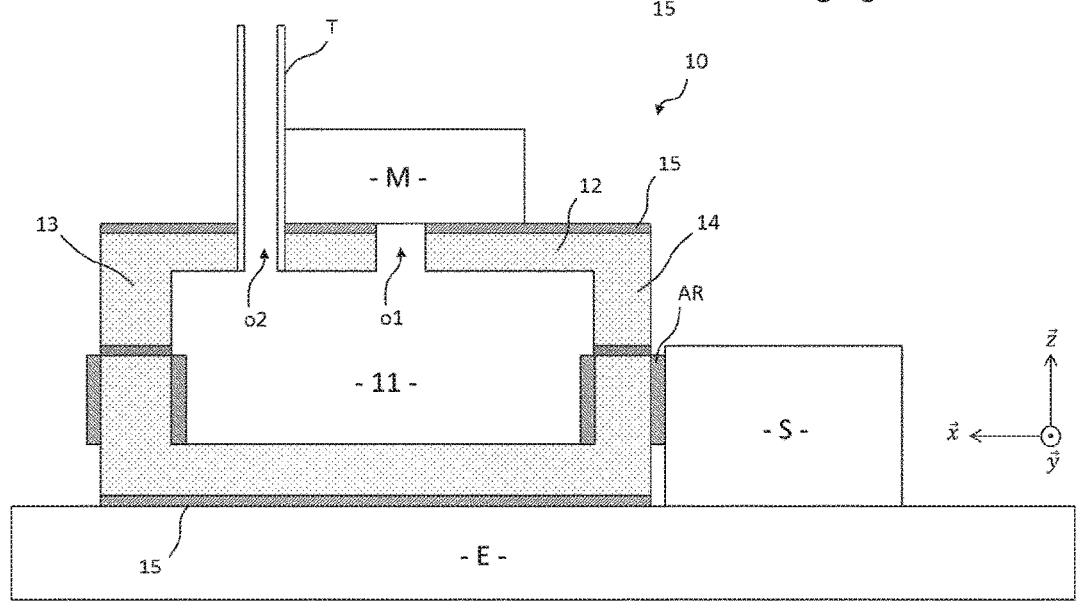
FIG. 10 shows a schematic representation of a photoacoustic device for detecting gas according to an embodiment of the invention, capable of being obtained by the manufacturing method of FIG. 8.

According to a sixth step 106 of the manufacturing method 100, represented in FIG. 9g, the side wall 12 of the photoacoustic cavity 11 is structured by deep etching directly in line with the first, second and third structurings s1, s2 of the mirror 15, so as to form a first opening o1 directly in line with the first structuring s1, a second opening o2 directly in line with the second structuring s2 and a third opening, not represented, directly in line with the third structuring. Unlike the first, second and third structurings s1, s2 of the mirror 15, the first, second and third openings o1, o2 of the side wall 12 emerge into the photoacoustic cavity 11. The first opening o1 is intended to ensure the connection with the microphone M. The second opening o2 is intended to form a gas inlet and the third opening is intended to form a gas outlet. FIG. 10 shows a schematic representation of a photoacoustic device for detecting gas according to an embodiment of the invention, capable of being obtained by the manufacturing method of FIG. 8. The photoacoustic cavity 11 and the light source S rest on a base E. The microphone M is coupled with the first opening o1 of the side wall 12 of the photoacoustic cavity 11. A tube T may be arranged in the second opening o2 so as to facilitate the input of a gas into the photoacoustic cavity 11. Another tube, not represented, may be arranged in the third opening so as to control the output of the gas from the photoacoustic cavity 11.

The invention claimed is:
1. A photoacoustic device for detecting gas comprising:
a photoacoustic cavity having a side wall extending between a first end and a second end and having an inner surface and an outer surface;
a light source configured to emit a light radiation supplying an excitation energy to a gas contained in the photoacoustic cavity, the light radiation being modu- lated at a pulse ω, the light source being coupled to the first end of the photoacoustic cavity;

a microphone coupled to the side wall of the photoacoustic cavity, wherein the photoacoustic cavity
is made of a material transparent to the light radiation of the light source selected from silica, silicon, germanium, indium phosphide or aluminium nitride;
wherein a mirror is arranged on at least one portion of the outer surface of the side wall;
wherein the side wall has a thickness e12 which is chosen as a function of the depth of penetration δ of a thermal wave coming from the mirror into said transparent material, in such a way that such a thermal wave is attenuated before arriving within the cavity, the depth of penetration δ being defined by:

$$\delta = \sqrt{2\alpha/\omega}$$

with α the thermal diffusivity of the transparent material and ω the pulse of the light source.

2. The photoacoustic device according to claim 1, wherein the thickness e12 of the side wall is such that:

$$e12 \geq \delta.$$

3. The photoacoustic device according to the claim 2, wherein the thickness e12 of the side wall is such that:

$$e12 \geq 2\pi\delta.$$

4. The photoacoustic device according to claim 2, wherein the thickness e12 of the side wall is such that:

$$e12 \leq 10\delta$$

5. The photoacoustic device according to claim 1, wherein the outer surface of the side wall of the photoacoustic cavity is of parallelepiped shape, and wherein the mirror is arranged on two opposite faces of the outer surface of the side wall of the photoacoustic cavity.

6. The photoacoustic device according to claim 5, wherein the mirror is arranged on each of the four faces of the outer surface of the side wall of the photoacoustic cavity.

7. The photoacoustic device according to claim 5, wherein the mirror is arranged on the two horizontal faces of the outer surface of the side wall of the photoacoustic cavity and wherein a second mirror is arranged parallel, at a distance equal to the thickness e12, to the two vertical faces of the outer surface of the side wall of the photoacoustic cavity.

8. The photoacoustic device according to claim 1, wherein the photoacoustic cavity comprises a first antireflective layer arranged on at least one portion of the outer surface of its first end, and/or a second antireflective layer arranged on at least one portion of the inner surface of its first end.

9. The photoacoustic device according to claim 1, wherein the light source emits a light radiation having a divergence greater than or equal to 20°.

10. The photoacoustic device according to claim 1, wherein the light source is a quantum cascade laser QCL source.

11. The photoacoustic device according to claim 1, wherein the photoacoustic cavity has a length, measured between the inner surfaces of the first and second ends, less than 5 cm.

12. The photoacoustic device according to claim 11, wherein the length, measured between the inner surfaces of the first and second ends, is less than 3 cm.

13. The photoacoustic device according to claim 12, wherein the length, measured between the inner surfaces of the first and second ends, is less than 2 cm.

14. The photoacoustic device according to claim 13, wherein the length, measured between the inner surfaces of the first and second ends, is less than 1 cm.

15. The photoacoustic device according to claim 1, further comprising:
a first photoacoustic cavity, a second photoacoustic cavity and first and second capillaries enabling the volumes of the first and second photoacoustic cavities to communicate with each other so as to form a resonant photoacoustic cavity of differential Helmholtz type;
the light source coupled to the first photoacoustic cavity;
a first microphone coupled to the first photoacoustic cavity and a second microphone coupled to the second photoacoustic cavity.

16. The photoacoustic device according to claim 15, further comprising an inlet channel making it possible to bring the gas into the first and second photoacoustic cavities via the first capillary and an outlet channel making it possible to evacuate the gas outside of the first and second photoacoustic cavities via the second capillary.

17. A method for manufacturing a photoacoustic device according to claim 1, comprising the following steps:
a first step according to which a first half-cavity is etched in a first wafer of the material transparent to the light radiation of the light source selected from silica, silicon, germanium, indium phosphide or aluminium nitride and a second half-cavity is etched in a second wafer of the transparent material;
a third step according to which the first and second etched wafers are assembled so as to form, from the first and second half-cavities, a whole photoacoustic cavity having a first end, a second end and a side wall between the first and second ends, the side wall having an inner surface and an outer surface;
a fourth step according to which a mirror is deposited on the outer surface of the side wall of the photoacoustic cavity;
a fifth step according to which the mirror is structured by local etching so as to create in the mirror at least a first structuring, a second structuring and a third structuring;
a sixth step according to which the side wall of the photoacoustic cavity is structured by deep etching directly in line with the first and second structurings of the mirror, so as to form a first opening directly in line with the first structuring, a second opening directly in line with the second structuring and a third opening directly in line with the third structuring, the first, second and third openings emerging into the photoacoustic cavity;
the thickness of the side wall is chosen as a function of the depth of penetration δ of a thermal wave coming from the mirror into said transparent material, in such a way that such a thermal wave is attenuated before arriving within the cavity, the depth of penetration δ being defined by:

$$\delta = \sqrt{2\alpha/\omega}$$

with α the thermal diffusivity of the transparent material and ω the pulse of the light source;
the light source is coupled to the first end of the photoacoustic cavity.

18. The method according to claim 17, further comprising, prior to the first step:
a first sub-step according to which a first trench is etched in the first wafer and a second trench is etched in the second wafer, and a second sub-step according to which a layer of a reflector is deposited on the first and second wafers so as to fill the first and second trenches, then a chemical mechanical planarization is carried out in order to only conserve the reflector filling the first and second trenches.

* * * * *